United States Patent
Coppola

(10) Patent No.: US 12,511,055 B2
(45) Date of Patent: Dec. 30, 2025

(54) PRODUCTION STATE AWARENESS DUMMY DATA MANAGEMENT

(71) Applicant: Micron Technology, Inc., Boise, ID (US)

(72) Inventor: Gianluca Coppola, Saviano (IT)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 18/606,438

(22) Filed: Mar. 15, 2024

(65) Prior Publication Data

US 2025/0181254 A1 Jun. 5, 2025

Related U.S. Application Data

(60) Provisional application No. 63/606,392, filed on Dec. 5, 2023.

(51) Int. Cl.
*G06F 3/06* (2006.01)
*G06F 12/02* (2006.01)

(52) U.S. Cl.
CPC .......... *G06F 3/0619* (2013.01); *G06F 3/0659* (2013.01); *G06F 3/0679* (2013.01); *G06F 12/0246* (2013.01); *G06F 2212/7205* (2013.01)

(58) Field of Classification Search
CPC .... G06F 3/0619; G06F 3/0679; G06F 3/0659; G06F 12/0246; G06F 2212/7205
See application file for complete search history.

(56) References Cited

U.S. PATENT DOCUMENTS

| 12,061,792 | B1* | 8/2024 | Yang | G06F 3/0679 |
| 2019/0187931 | A1* | 6/2019 | Byun | G06F 13/1642 |
| 2023/0350582 | A1* | 11/2023 | Visconti | G11C 11/2275 |

* cited by examiner

*Primary Examiner* — Hiep T Nguyen
(74) *Attorney, Agent, or Firm* — Harrity & Harrity, LLP

(57) ABSTRACT

Implementations described herein relate to production state awareness dummy data management. In some implementations, a memory device may detect a flag associated with a production state awareness process of the memory device. A first value of the flag may indicate for the memory device to write a default amount of dummy data during a write operation and a second value of the flag may indicate for the memory device to write a reduced amount of dummy data during the write operation. The memory device may perform a write operation in accordance with the flag.

20 Claims, 6 Drawing Sheets

PRODUCTION STATE AWARENESS DUMMY DATA MANAGEMENT

CROSS REFERENCE TO RELATED APPLICATION

This patent application claims priority to U.S. Provisional Patent Application No. 63/606,392, filed on Dec. 5, 2023, and entitled "PRODUCTION STATE AWARENESS DUMMY DATA MANAGEMENT." The disclosure of the prior application is considered part of and is incorporated by reference into this patent application.

TECHNICAL FIELD

The present disclosure generally relates to memory devices, memory device operations, and, for example, to production state awareness dummy data management.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
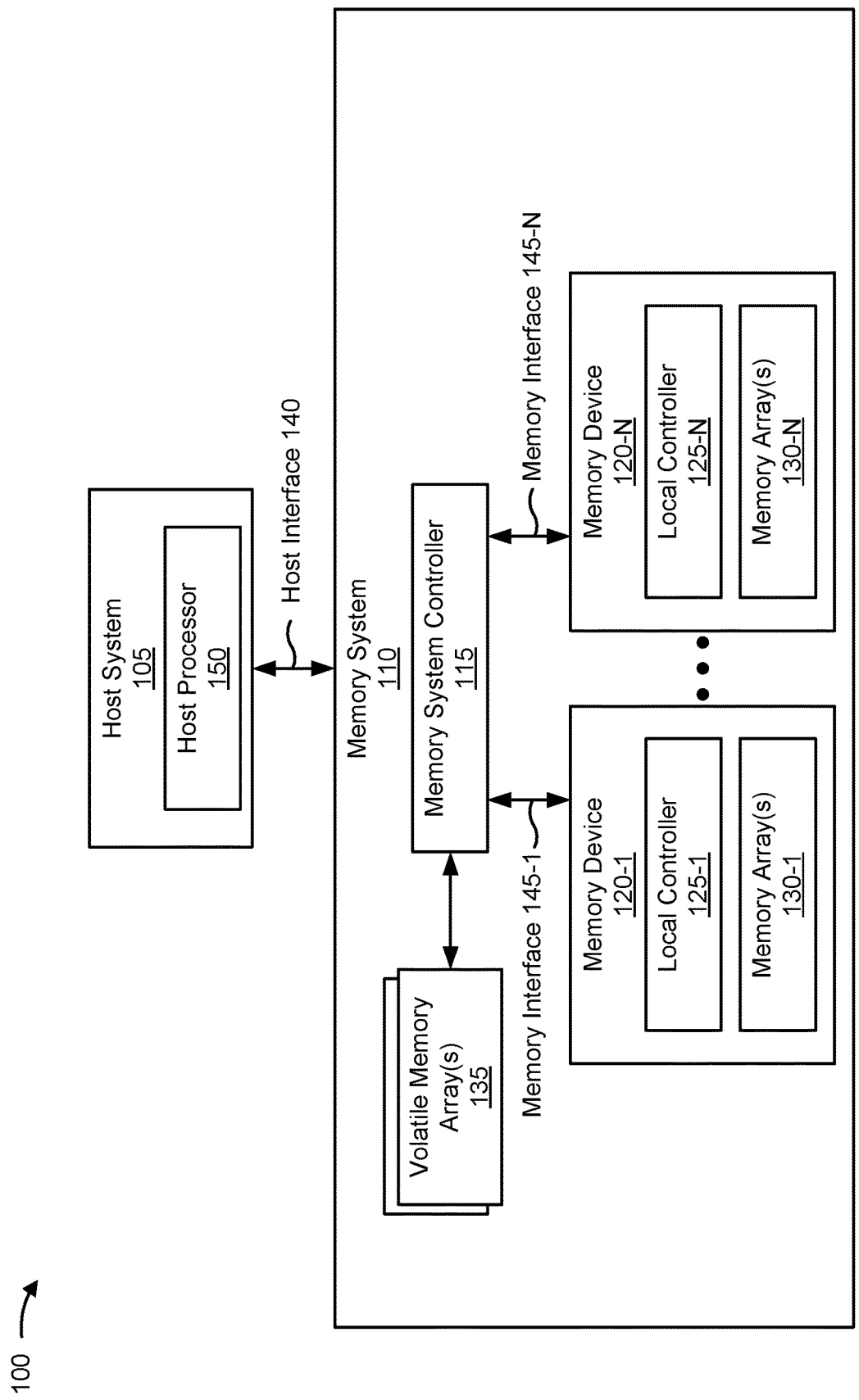
FIG. 1 is a diagram illustrating an example system capable of production state awareness dummy data management.

Memory devices are electronic components that are capable of storing and retrieving data within various electronic systems. A memory device may include volatile memory (such as RAM) that loses data when power is removed and/or may include non-volatile memory that retains data after power is removed. NAND memory is a type of non-volatile memory that is structured as an array of memory cells and is organized into pages and blocks. A NAND memory device may perform read operations to retrieve data from the memory cells, may perform write operations to program new data into the memory cells or to move data around within the memory cells (for example, to maintain an even wear on the memory cells and to extend a lifespan of the NAND device), and may perform erase operations to erase data from the memory cells (for example, a block of memory cells).

A managed NAND (mNAND) is a type of memory device that integrates NAND memory chips with a memory controller and firmware into a single package. This integration offers a complete, self-contained storage solution that may be used in embedded systems such as smartphones, tablets, smart televisions, and Internet of Things (IoT) devices. Managed NAND devices simplify the integration process for device manufacturers by providing a standardized interface, error correction, wear-leveling, and block management within the single package, thereby reducing the complexity of managing the NAND memory at the software level and at the firmware level. Managed NAND may be an attractive option for applications where data storage is to be compact, reliable, and easy to integrate (for example, in order to save time and reduce development complexities).

A managed NAND may be programmed before the device is soldered into a system (for example, onto a circuit board). Reflow is a thermal process where solder, that is used to connect the memory device components to the circuit board, is heated until becoming liquid. This may allow for electrical connections to be established and for joint defects to be repaired, which may increase reliable contacts between the memory device components and the circuit board. Memory devices, such as managed NAND devices, may be sensitive to reflow. For example, high temperatures used in the reflow soldering process may affect the physical and electrical properties of the memory device, potentially resulting in data loss, performance reduction, or structural damage to the memory device. In some examples, a production state awareness (PSA) feature may be used to program data into the memory device before the reflow process occurs. The PSA feature may enable the memory device to monitor and adjust operations based on a current state of the memory device and/or a condition of the manufacturing process. When using the PSA feature, the memory device may adjust internal operations in order to be more robust against reflow. For example, a triple-level cell (TLC) based mNAND may reconfigure memory blocks into single-level cell (SLC) memory blocks during a PSA process. In this example, a pre-programming percentage may be reduced from one hundred percent to thirty-three percent of the user area space of the memory device. In the example that the memory device is a universal flash storage (UFS) device, a PSA maximum data size (dPSAMaxDataSize) indicator may indicate a maximum amount of data that can be pre-loaded into all logical units that are sensitive to reflow. A host device set a PSA data size (dPSADataSize) to indicate the amount of data that is to be pre-loaded into the sensitive logical units. The PSA data size may be based on the PSA maximum data size.

When performing a write operation, an mNAND device may write dummy data into the NAND memory in addition to the host data. Dummy data may include one or more bits that do not correspond to useful data but instead are intended to reserve space or to add padding for the host data. In one example, the dummy data may be a sequence of bits having a value zero. The mNAND may write the dummy data based on a firmware architecture, a defined data path, a NAND topology, and/or a customer usage model. In an example that the NAND has a physical page equal to 16 kilobytes (KB) and a host write operation has a chunk size equal to 4 KB, the firmware may write 4 KB of host data plus 12 KB of dummy data for each 16 KB physical page. In some examples, a force unit access function of the memory device may be set to zero. In this example, data may first be written to a RAM cache area and then flushed to the NAND device. This may allow the firmware to reduce the amount of dummy data that is written to the NAND memory. Alternatively, a user may set the force unit access function to one in order to store data into the NAND directly (for example, to reduce a likelihood of data loss during a power loss).

The host device may write data to the memory device after setting the PSA data size to a certain value. Based on the chunk size of the data, the command sequence, and one or more command settings, the memory device firmware may write data (host data) and dummy data into the NAND memory during a PSA write flow. In some examples, the allocated space for the host data may be exhausted (for example, filled) before all of the data indicated by the PSA data size is written to the NAND memory. Since a certain amount of NAND storage is occupied by the dummy data, there may not be enough free space to store all of the data indicated by the PSA data size. In one example, the PSA maximum data size may be equal to thirty-three percent of the NAND memory that is allocated to be used by the host device, and the host device may set the PSA data size to be close to the PSA maximum data size (for example, at thirty percent). By adding dummy data when performing a write operation, it is possible that there may not be sufficient available memory to write all of the host data indicated by the PSA data size. As a result, the memory device may report an error to the host device, and the host device may not be able to complete the PSA write flow to the NAND using the defined PSA data size value.

Various implementations described herein enable production state awareness dummy data management. A host device may send, to a memory device, a flag associated with a PSA process. The memory device may be a mNAND device, such as a UFS device. The flag may have a first value or a second value. The first value of the flag may indicate that the memory device is to write a first amount of dummy data and the second value of the flag may indicate that the memory device is to write a second amount of dummy data that is less than the first amount of dummy data. For example, the first value of the flag may indicate that the memory device is to write a standard quantity of dummy bits during a PSA write operation and the second value of the flag may indicate that the memory device is to write a reduced quantity of dummy bits during the PSA write operation. In some implementations, the memory device may detect that a PSA data size is greater than a threshold percentage of a PSA maximum data size. In this example, the memory device may initiate a garbage collection operation during the PSA process to discard dummy data and to move valid host data into the NAND memory. The memory device may adjust the threshold percentage of the PSA maximum data size in accordance with an amount of host data to be written and/or in accordance with an amount of available memory. As described in more detail below, writing the reduced quantity of dummy bits to the memory of the memory device in accordance with the flag may increase a likelihood of the memory device writing all of the valid host data to the memory of the memory device, and may reduce a likelihood of error occurrences during the PSA process.

FIG. 1 is a diagram illustrating an example system 100 capable of production state awareness dummy data management. The system 100 may include one or more devices, apparatuses, and/or components for performing operations described herein. For example, the system 100 may include a host system 105 and a memory system 110. The memory system 110 may include a memory system controller 115 and one or more memory devices 120, shown as memory devices 120-1 through 120-N (where N≥1). A memory device may include a local controller 125 and one or more memory arrays 130. The host system 105 may communicate with the memory system 110 (e.g., the memory system controller 115 of the memory system 110) via a host interface 140. The host system 105 may be referred to herein as a "host device." For example, the host system 105 may be the host device or may be included in the host device. The memory system controller 115 and the memory devices 120 may communicate via respective memory interfaces 145, shown as memory interfaces 145-1 through 145-N (where N≥ 1).

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an IoT device. The host system 105 may include a host processor 150. The host processor 150 may include one or more processors configured to execute instructions and store data in the memory system 110. For example, the host processor 150 may include a central processing unit (CPU), a graphics processing unit (GPU), a field-programmable gate array (FPGA), an application-specific integrated circuit (ASIC), and/or another type of processing component.

The memory system 110 may be any electronic device or apparatus configured to store data in memory. For example, the memory system 110 may be a hard drive, a solid-state drive (SSD), a flash memory system (e.g., a NAND flash memory system or a NOR flash memory system), a universal serial bus (USB) drive, a memory card (e.g., a secure digital (SD) card), a secondary storage device, a non-volatile memory express (NVMe) device, an embedded multimedia card (eMMC) device, a dual in-line memory module (DIMM), and/or a random-access memory (RAM) device, such as a dynamic RAM (DRAM) device or a static RAM (SRAM) device.

The memory system controller 115 may be any device configured to control operations of the memory system 110 and/or operations of the memory devices 120. For example, the memory system controller 115 may include control logic, a memory controller, a system controller, an ASIC, an FPGA, a processor, a microcontroller, and/or one or more processing components. In some implementations, the memory system controller 115 may communicate with the host system 105 and may instruct one or more memory devices 120 regarding memory operations to be performed by those one or more memory devices 120 based on one or more instructions from the host system 105. For example, the memory system controller 115 may provide instructions to a local controller 125 regarding memory operations to be performed by the local controller 125 in connection with a corresponding memory device 120.

A memory device 120 may include a local controller 125 and one or more memory arrays 130. In some implementations, a memory device 120 includes a single memory array 130. In some implementations, each memory device 120 of the memory system 110 may be implemented in a separate semiconductor package or on a separate die that includes a respective local controller 125 and a respective memory array 130 of that memory device 120. The memory system 110 may include multiple memory devices 120.

A local controller 125 may be any device configured to control memory operations of a memory device 120 within which the local controller 125 is included (e.g., and not to control memory operations of other memory devices 120). For example, the local controller 125 may include control logic, a memory controller, a system controller, an ASIC, an FPGA, a processor, a microcontroller, and/or one or more processing components. In some implementations, the local controller 125 may communicate with the memory system controller 115 and may control operations performed on a memory array 130 coupled with the local controller 125 based on one or more instructions from the memory system controller 115. As an example, the memory system controller 115 may be an SSD controller, and the local controller 125 may be a NAND controller.

A memory array 130 may include an array of memory cells configured to store data. For example, a memory array 130 may include a non-volatile memory array (e.g., a NAND memory array or a NOR memory array) or a volatile memory array (e.g., an SRAM array or a DRAM array). In some implementations, the memory system 110 may include one or more volatile memory arrays 135. A volatile memory array 135 may include an SRAM array and/or a DRAM array, among other examples. The one or more volatile memory arrays 135 may be included in the memory system controller 115, in one or more memory devices 120, and/or in both the memory system controller 115 and one or more memory devices 120. In some implementations, the memory system 110 may include both non-volatile memory capable of maintaining stored data after the memory system 110 is powered off and volatile memory (e.g., a volatile memory array 135) that requires power to maintain stored data and that loses stored data after the memory system 110 is powered off. For example, a volatile memory array 135 may cache data read from or to be written to non-volatile memory, and/or may cache instructions to be executed by a controller of the memory system 110.

The host interface 140 enables communication between the host system 105 (e.g., the host processor 150) and the memory system 110 (e.g., the memory system controller 115). The host interface 140 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a UFS interface, an eMMC interface, a double data rate (DDR) interface, and/or a DIMM interface.

The memory interface 145 enables communication between the memory system 110 and the memory device 120. The memory interface 145 may include a non-volatile memory interface (e.g., for communicating with non-volatile memory), such as a NAND interface or a NOR interface. Additionally, or alternatively, the memory interface 145 may include a volatile memory interface (e.g., for communicating with volatile memory), such as a DDR interface.

Although the example memory system 110 described above includes a memory system controller 115, in some implementations, the memory system 110 does not include a memory system controller 115. For example, an external controller (e.g., included in the host system 105) and/or one or more local controllers 125 included in one or more corresponding memory devices 120 may perform the operations described herein as being performed by the memory system controller 115. Furthermore, as used herein, a "controller" may refer to the memory system controller 115, a local controller 125, or an external controller. In some implementations, a set of operations described herein as being performed by a controller may be performed by a single controller. For example, the entire set of operations may be performed by a single memory system controller 115, a single local controller 125, or a single external controller. Alternatively, a set of operations described herein as being performed by a controller may be performed by more than one controller. For example, a first subset of the operations may be performed by the memory system controller 115 and a second subset of the operations may be performed by a local controller 125. Furthermore, the term "memory apparatus" may refer to the memory system 110 or a memory device 120, depending on the context.

A controller (e.g., the memory system controller 115, a local controller 125, or an external controller) may control operations performed on memory (e.g., a memory array 130), such as by executing one or more instructions. For example, the memory system 110 and/or a memory device 120 may store one or more instructions in memory as firmware, and the controller may execute those one or more instructions. Additionally, or alternatively, the controller may receive one or more instructions from the host system 105 and/or from the memory system controller 115, and may execute those one or more instructions. In some implementations, a non-transitory computer-readable medium (e.g., volatile memory and/or non-volatile memory) may store a set of instructions (e.g., one or more instructions or code) for execution by the controller. The controller may execute the set of instructions to perform one or more operations or methods described herein. In some implementations, execution of the set of instructions, by the controller, causes the controller, the memory system 110, and/or a memory device 120 to perform one or more operations or methods described herein. In some implementations, hardwired circuitry is used instead of or in combination with the one or more instructions to perform one or more operations or methods described herein. Additionally, or alternatively, the controller may be configured to perform one or more operations or methods described herein. An instruction is sometimes called a "command."

For example, the controller (e.g., the memory system controller 115, a local controller 125, or an external controller) may transmit signals to and/or receive signals from memory (e.g., one or more memory arrays 130) based on the one or more instructions, such as to transfer data to (e.g., write or program), to transfer data from (e.g., read), to erase, and/or to refresh all or a portion of the memory (e.g., one or more memory cells, pages, sub-blocks, blocks, or planes of the memory). Additionally, or alternatively, the controller may be configured to control access to the memory and/or to provide a translation layer between the host system 105 and the memory (e.g., for mapping logical addresses to physical addresses of a memory array 130). In some implementations, the controller may translate a host interface command (e.g., a command received from the host system 105) into a memory interface command (e.g., a command for performing an operation on a memory array 130).

In some implementations, one or more systems, devices, apparatuses, components, and/or controllers of FIG. 1 may be configured to detect a flag associated with a production state awareness process of the memory device, wherein a first value of the flag indicates for the memory device to write a first amount of dummy data during a write operation and a second value of the flag indicates for the memory device to write a second amount of dummy data during the write operation, wherein the second amount of dummy data is less than the first amount of dummy data; and perform a write operation in accordance with the flag.

In some implementations, one or more systems, devices, apparatuses, components, and/or controllers of FIG. 1 may be configured to: set a production state awareness data size for a production state awareness process in accordance with a production state awareness maximum data size; and send, to a memory device and based on setting the production state awareness data size, a flag associated with the production state awareness process, wherein a first value of the flag indicates for the memory device to write a first amount of dummy data during a write operation and a second value of the flag indicates for the memory device to write a second amount of dummy data during the write operation, wherein the second amount of dummy data is less than the first amount of dummy data.

In some implementations, one or more systems, devices, apparatuses, components, and/or controllers of FIG. 1 may be configured to detect a flag associated with a production state awareness process of the memory device, wherein a first value of the flag indicates for the memory device to write a default amount of dummy data during a write operation and a second value of the flag indicates for the memory device to write a reduced amount of dummy data during the write operation; and perform a write operation in accordance with the flag.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more operations described as being performed by another set of components shown in FIG. 1.

Figure 2:
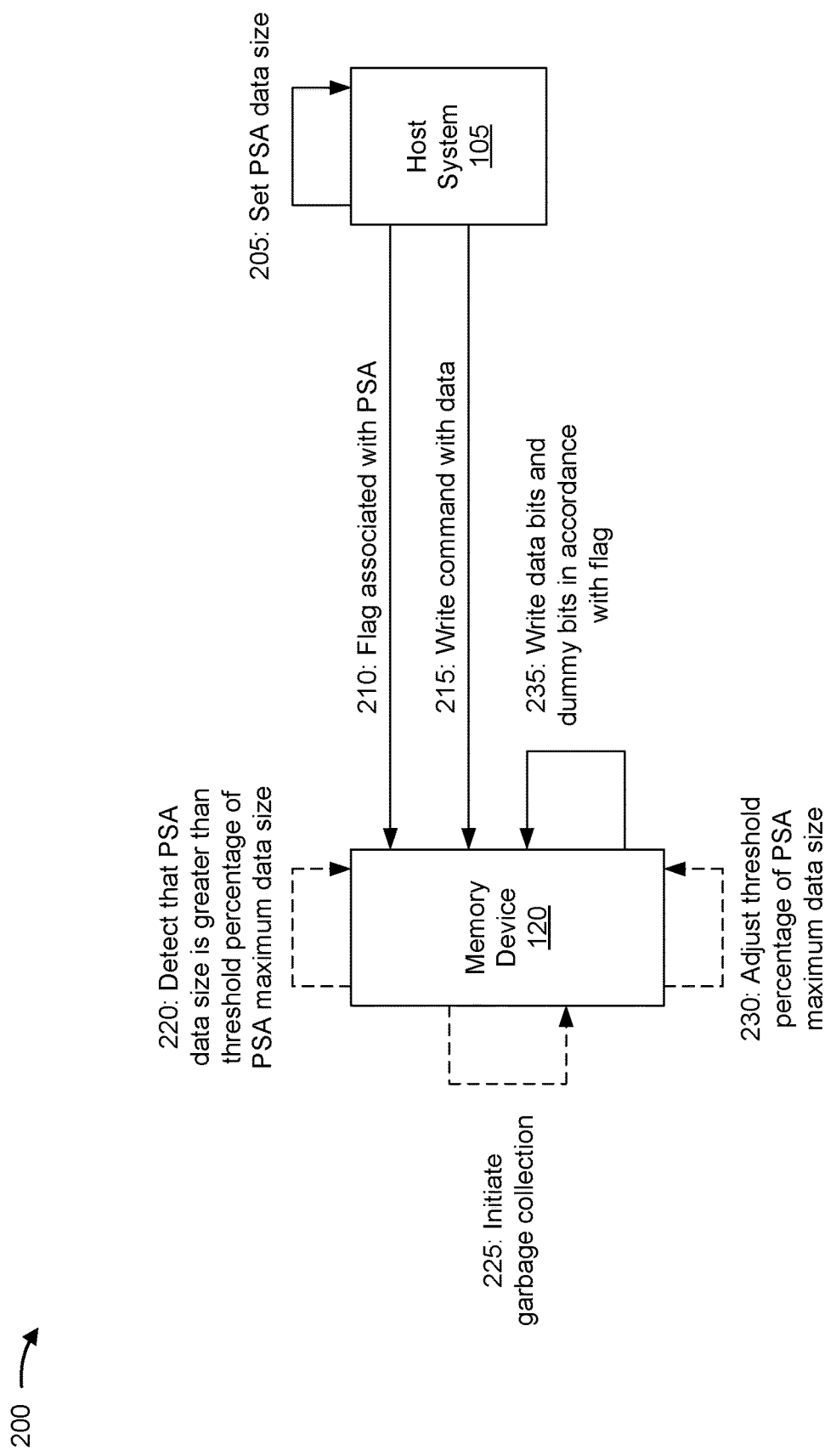
FIG. 2 is a diagram of an example of production state awareness dummy data management.

FIG. 2 is a diagram of an example 200 of production state awareness dummy data management. The operations described in connection with FIG. 2 may be performed by the memory system 110 and/or one or more components of the memory system 110, such as the memory system controller 115, one or more memory devices 120, and/or one or more local controllers 125. For example, operations described as being performed by the memory device 120 may be performed by any one or more components of the memory system 110. Additionally, or alternatively, the operations described in connection with FIG. 2 may be performed by the host system 105 and/or one or more components of the host system 105, such as the host processor 150. The memory system 110 and the host system 105 may communicate, for example, via the host interface 140 described in connection with FIG. 1.

As shown by reference number 205, the host system 105 may set a PSA data size (dPSADataSize) for a PSA process. The host system 105 may set the PSA data size in accordance with a PSA maximum data size (dPSAMaxDataSize). For example, the host system 105 may set the PSA data size based on a percentage of the PSA maximum data size. In one example, the host system 105 may set the PSA data size to be thirty percent of the PSA maximum data size. In another example, the host system 105 may set the PSA data size to be fifty percent of the PSA maximum data size.

As shown by reference number 210, the host system 105 may send a flag to the memory device 120. The flag may be associated with the PSA process. The flag may have a first value or a second value. For example, the flag may be a single bit that has a first value ("0") or a second value ("1"). The first value of the flag may indicate that the memory device 120 is to use a first (for example, default) firmware management for dummy data during a PSA flow, and the second value of the flag may indicate that the memory device 120 is to use a second firmware management for dummy data during the PSA flow. The second firmware management may be associated with the firmware of the memory device 120 minimizing or nulling dummy data bits during the PSA process. In some implementations, the first value of the flag indicates that the memory device 120 is to write a first amount of dummy data during the PSA process, and the second value of the flag indicates that the memory device 120 is to write a second amount of dummy data during the PSA process, where the second amount of dummy data is less than the first amount of dummy data. For example, the first value of the flag may indicate that the memory device 120 is to write a default quantity of dummy bits during the PSA process and the second value of the flag may indicate that the memory device 120 is to write a reduced quantity of dummy bits during the PSA process. In some implementations, the host system 105 may set the flag to the second value ("1") each time that the host system 105 is to program the mNAND using the PSA process.

As shown by reference number 215, the host system 105 may send a write command to the memory device 120. The write command may include data (host data) that is to be written to the memory of the memory device 120. The data may be data associated with the PSA process (for example, data associated with a PSA write flow).

As shown by reference number 220, the memory device 120 may detect that the PSA data size is greater than a threshold percentage of the PSA maximum data size. For example, the memory device 120 may detect that the host system 105 has set the PSA data size to be greater than forty percent of the PSA maximum data size and/or may detect that the host system 105 is writing an amount of data to the memory device 120 that is greater than forty percent of the PSA maximum data size.

As shown by reference number 225, the memory device 120 may initiate a garbage collection. The memory device 120 (for example, the firmware of the memory device 120) may initiate the garbage collection based on detecting that the PSA data size is greater than the threshold percentage of the PSA maximum data size. In some implementations, the firmware of the memory device 120 may initiate the garbage collection during the PSA flow in order to discard dummy data and/or to move valid host data into a NAND available area. This may free up space in the memory in order to enable a quantity of data corresponding to the PSA data size to be written to the memory of the memory device 120.

As shown by reference number 230, the memory device 120 may adjust the threshold percentage of the PSA maximum data size. In some implementations, the threshold percentage of the PSA maximum data size may not be fixed (for example, may be able to be adjusted). The memory device 120 may adjust the maximum threshold, for example, based on a host system usage model during the PSA write flow and/or based on an amount of available memory during the PSA write flow. In some implementations, the memory device 120 may initiate or delay garbage collection by adjusting the threshold percentage. For example, the memory device 120 may initiate (or plan) the garbage collection based on reducing the threshold percentage or may delay the garbage collection based on increasing the threshold percentage.

As shown by reference number 235, the memory device 120 may write data bits (host data bits) and dummy bits to the memory of the memory device 120 in accordance with the flag. As described above, when the host system 105 sets the flag to the second value ("1"), the firmware of the memory device 120 may reduce (for example, minimize or nullify) the amount of dummy data to be written during the PSA write flow. In accordance with detecting that the flag has the first value, the memory device 120 may write a default quantity of dummy bits with the data bits during the PSA write flow. As described in the example above, for a 16 KB page of memory, the memory device 120 may write 4 KB of data (host data) and 12 KB of dummy data. Alternatively, in accordance with detecting that the flag has the second value, the memory device 120 may write a reduced quantity of dummy bits with the data bits during the PSA write flow. For example, the memory device 120 may write 12 KB of data (host data) and 4 KB of dummy data for the 16 KB page of memory. In another example, the memory device 120 may not write any dummy data. For example, the memory device 120 may write 16 KB of host data (or nearly 16 KB of host data) to the 16 KB page of memory. In some implementations, if the firmware of the memory device 120 is using a multi-plane write operation, and in accordance with the flag having the second value, the firmware may change the write operation to the NAND from a multi-plane write to a single-plane write for the PSA write flow. In some implementations, when the host system 105 sets the flag to the second value ("1"), the host device 105 may identify that the firmware of the memory device 120 may change the pre-defined data path and may have reduced performance during the PSA write flow.

As described herein, due to dummy data usage, the host system 105 may not be able to complete a PSA write flow to the memory device 120 (mNAND) successfully with pre-defined quantity of data (dPSADataSize) and a defined usage model. In some examples, the host system 105 may repeat the PSA flow by changing the usage model (for example, changing the command sequence, chunk size, usage of synchronization cache, or hibernate, among other examples) over several attempts to complete the PSA flow successfully with the pre-defined quantity of data dPSADataSize. However, this may be inefficient by requiring multiple repetitions of the PSA write flow. The implementations described herein reduce a likelihood of the host system 105 repeating the flow with several attempts until the completion of PSA flow with the pre-defined quantity of data. The host system 105 may not be required to design the usage model (during the PSA write flow) based on specific mNAND products. In order to minimize the dummy data usage, a memory vendor may indicate an optimal command sequence to be applied to the host device.

As indicated above, FIG. 2 is provided as an example. Other examples may differ from what is described with regard to FIG. 2.

Figure 3:
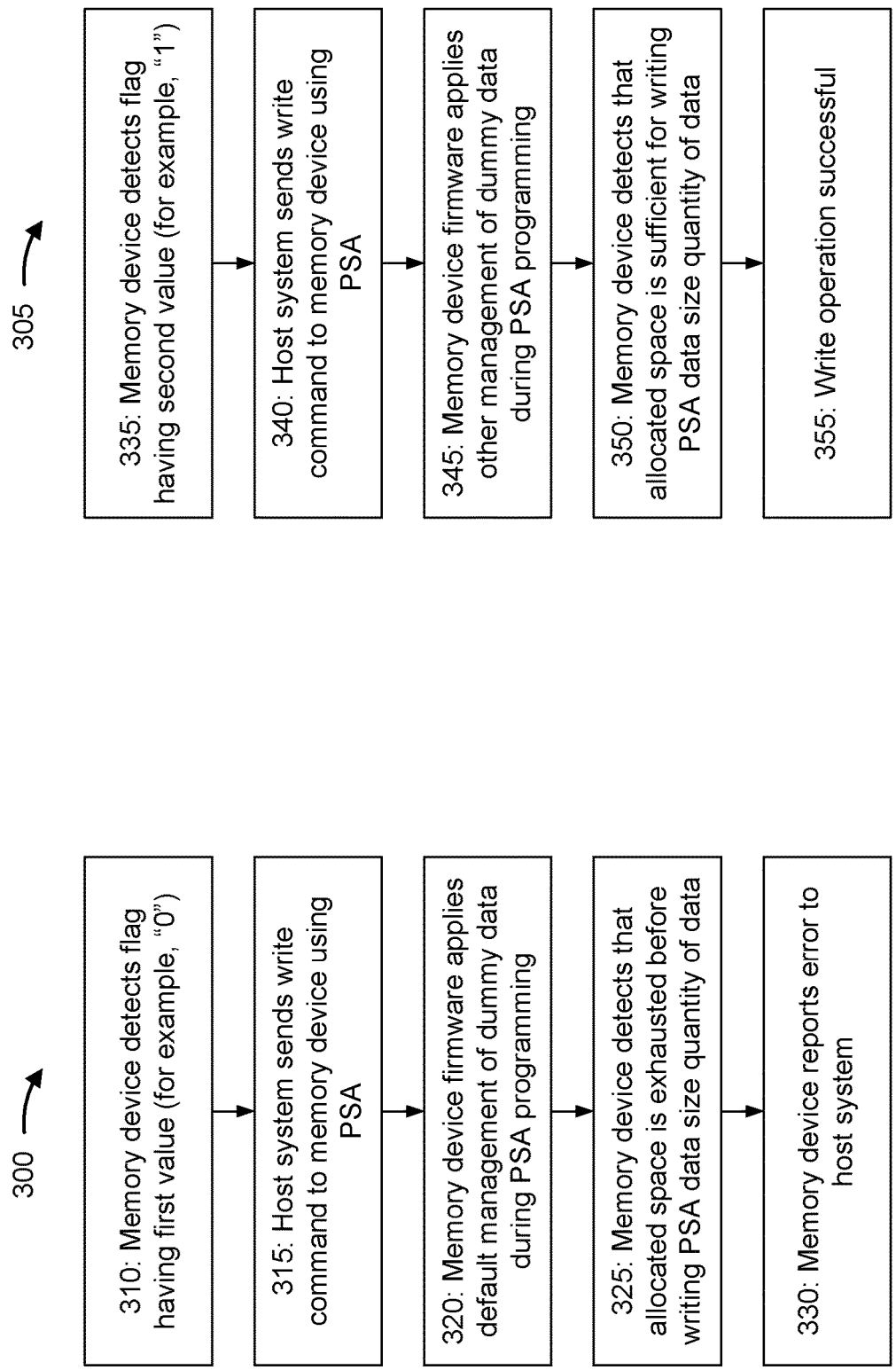
FIG. 3 is a diagram of examples of production state awareness dummy data management operations based on flag values.

FIG. 3 is a diagram of examples 300 and 305 of production state awareness dummy data management operations based on flag values. The operations described in connection with FIG. 3 may be performed by the memory system 110 and/or one or more components of the memory system 110, such as the memory system controller 115, one or more memory devices 120, and/or one or more local controllers 125. For example, operations described as being performed by the memory device 120 may be performed by any one or more components of the memory system 110. Additionally, or alternatively, the operations described in connection with FIG. 2 may be performed by the host system 105 and/or one or more components of the host system 105, such as the host processor 150.

As shown in example 300 and by reference number 310, the memory device 120 may detect a flag having a first value ("0"). For example, the host system 105 may send, and the memory device 120 may receive, the flag having the first value. As shown by reference number 315, the host system 105 may send a write command to the memory device 120. The write command may be associated with a PSA process (for example, a PSA write flow) and may include host data to be written to the memory of the memory device 120. As shown by reference number 320, the firmware of the memory device 120 may apply a default management of dummy data during PSA programming. For example, the memory device 120 may write a default quantity of dummy bits to the memory of the memory device 120 while performing a write operation for the host data. As shown by reference number 325, the memory device 120 may detect that allocated space in the memory of the memory device 120 is exhausted before a quantity of data indicated by the PSA data size is written to the memory of the memory device 120. For example, the allocated space of the memory may include a large quantity of dummy bits, which may reduce a capacity of the allocated space of the memory below a capacity that is needed to write the host data (corresponding to the PSA data size) to the allocated space of the memory. As shown by reference number 330, the memory device 120 may report an error to the host system 105. The error may indicate that the allocated space of the memory is not sufficient for receiving the host data, for example, due to the large quantity of dummy bits written to the allocated space of the memory.

As shown in example 305 and by reference number 335, the memory device 120 may detect a flag having a second value ("1"). For example, the host system 105 may send, and the memory device 120 may receive, the flag having the second value. As shown by reference number 340, the host system 105 may send a write command to the memory device 120. The write command may be associated with a PSA process (for example, a PSA write flow) and may include host data to be written to the memory of the memory device 120. As shown by reference number 345, the firmware of the memory device 120 may apply another (for example, special) management of dummy data during PSA programming. For example, the memory device 120 may write a reduced quantity of dummy bits to the memory of the memory device 120 and/or may nullify one or more dummy bits while performing a write operation for the host data. As shown by reference number 350, the memory device 120 may detect that allocated space in the memory of the memory device 120 is sufficient for writing a quantity of data indicated by the PSA data size to the memory of the memory device 120. For example, the allocated space of the memory may include a reduced quantity of dummy bits, which may increase a likelihood of the allocated space of the memory being above a capacity that is needed to write the host data (corresponding to the PSA data size) to the allocated space of the memory. As shown by reference number 355, the memory device 120 may report that the write operation is successful.

As indicated above, FIG. 3 is provided as an example. Other examples may differ from what is described with regard to FIG. 3.

Figure 4:
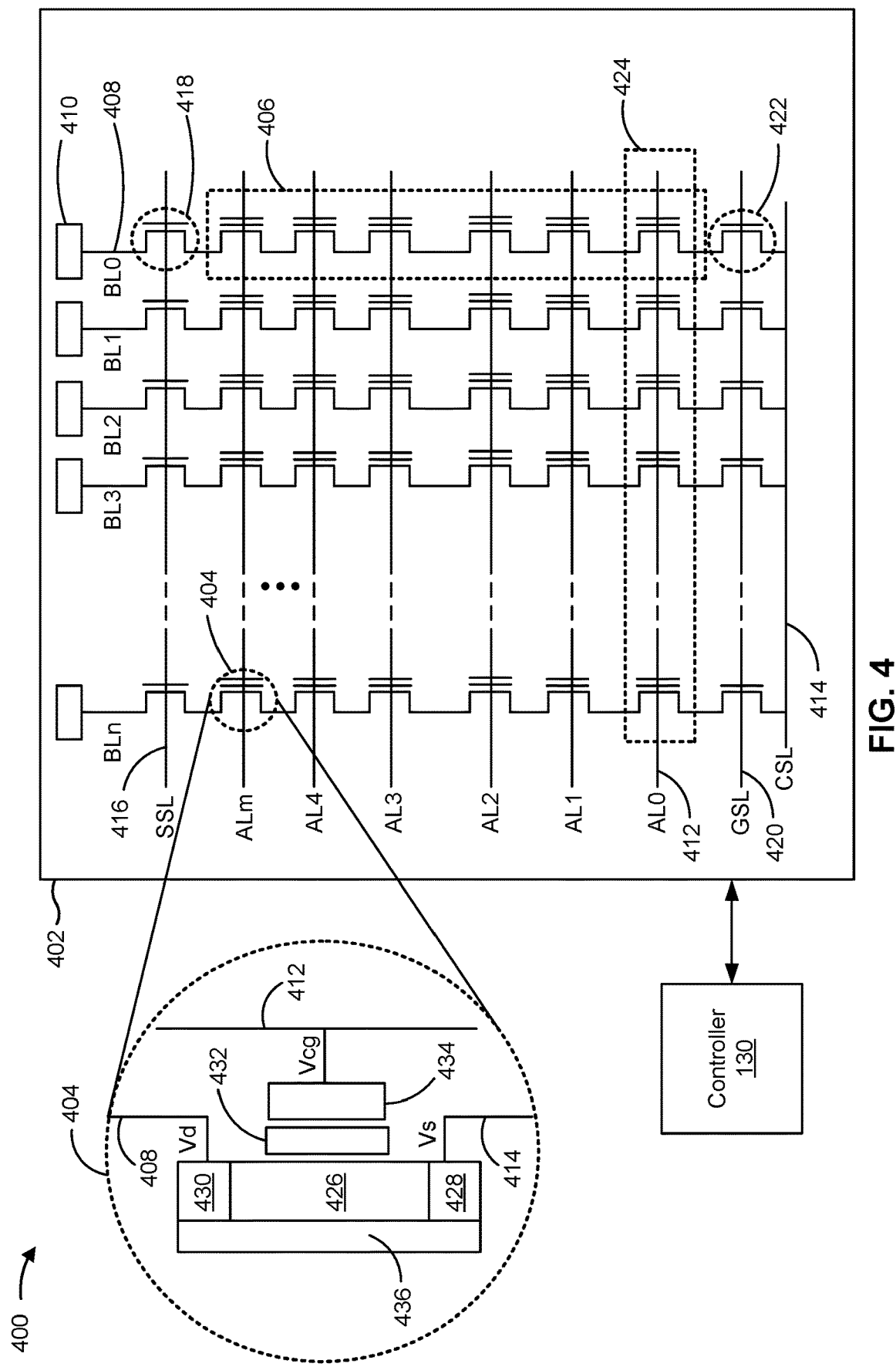
FIG. 4 is a diagram of example components included in a memory device.

FIG. 4 is a diagram of example components 400 included in a memory device 120. As described above in connection with FIG. 1, the memory system 110 may include a memory device 120, and the memory device 120 may include a local controller 125 and one or more memory arrays 130. As shown in FIG. 4, the one or more memory arrays 130 may correspond to the non-volatile memory arrays described above in connection with FIG. 2.

In FIG. 4, the memory array 402 is a NAND memory array. However, in some implementations, the memory array 402 may be another type of memory array, such as a NOR memory array, a resistive RAM (RRAM) memory array, a magneto-resistive RAM (MRAM) memory array, a ferroelectric RAM (FeRAM) memory array, a spin-transfer torque RAM (STT-RAM) memory array, or the like. In some implementations, the memory array 402 is part of a three-dimensional stack of memory arrays, such as 3D NAND flash memory, 3D NOR flash memory, or the like.

The memory array 402 includes multiple memory cells 404. A memory cell 404 may store an analog value, such as an electrical voltage or an electrical charge, that represents a data state (e.g., a digital value). The analog value and corresponding data state depend on a quantity of electrons trapped or present within a region of the memory cell 404 (e.g., in a charge trap, such as a floating gate), as described below.

A NAND string 406 (sometimes called a string) may include multiple memory cells 404 connected in series. A NAND string 406 is coupled to a bit line 408 (sometimes called a digit line or a column line, and shown as BL0-BLn). Data can be read from or written to the memory cells 404 of a NAND string 406 via a corresponding bit line 408 using one or more input/output (I/O) components 410 (e.g., an I/O circuit, an I/O bus, a page buffer, and/or a sensing component, such as a sense amplifier). Memory cells 404 of different NAND strings 406 (e.g., one memory cell 404 per NAND string 406) may be coupled with one another via access lines 412 (sometimes called word lines or row lines, and shown as AL0-ALm) that select which row (or rows) of memory cells 404 is affected by a memory operation (e.g., a read operation or a write operation).

A NAND string 406 may be connected to a bit line 408 at one end and a common source line (CSL) 414 at the other end. A string select line (SSL) 416 may be used to control respective string select transistors 418. A string select transistor 418 selectively couples a NAND string 406 to a corresponding bit line 408. A ground select line (GSL) 420 may be used to control respective ground select transistors 422. A ground select transistor 422 selectively couples a NAND string 406 to the common source line 414.

A "page" of memory (or "a memory page") may refer to a group of memory cells 404 connected to the same access line 412, as shown by reference number 424. In some implementations (e.g., for single-level cells), the memory cells 404 connected to an access line 412 may be associated with a single page of memory. In some implementations (e.g., for multi-level cells), the memory cells 404 connected to an access line 412 may be associated with multiple pages of memory, where each page represents one bit stored in each of the memory cells 404 (e.g., a lower page that represents a first bit stored in each memory cell 404 and an upper page that represents a second bit stored in each memory cell 404). In NAND memory, a page is the smallest physically addressable data unit for a write operation (sometimes called a program operation).

In some implementations, a memory cell 404 is a floating-gate transistor memory cell. In this case, the memory cell 404 may include a channel 426, a source region 428, a drain region 430, a floating gate 432, and a control gate 434. The source region 428, the drain region 430, and the channel 426 may be on a substrate 436 (e.g., a semiconductor substrate). The memory device 120 may store a data state in the memory cell 404 by charging the floating gate 432 to a particular voltage associated with the data state and/or to a voltage that is within a range of voltages associated with the data state. This results in a predefined amount of current flowing through the channel 426 (e.g., from the source region 428 to the drain region 430) when a specified read voltage is applied to the control gate 434 (e.g., by a corresponding access line 412 connected to the control gate 434). Although not shown, a tunnel oxide layer (or tunnel dielectric layer) may be interposed between the floating gate 432 and the channel 426, and a gate oxide layer (e.g., a gate dielectric layer) may be interposed between the floating gate 432 and the control gate 434. As shown, a drain voltage Vd may be supplied from a bit line 408, a control gate voltage Veg may be supplied from an access line 412, and a source voltage Vs may be supplied via the common source line 414 (which, in some implementations, is a ground voltage).

To write or program the memory cell 404, Fowler-Nordheim tunneling may be used. For example, a strong positive voltage potential may be created between the control gate 434 and the channel 426 (e.g., by applying a large positive voltage to the control gate 434 via a corresponding access line 412) while current is flowing through the channel 426 (e.g., from the common source line 414 to the bit line 408, or vice versa). The strong positive voltage at the control gate 434 causes electrons within the channel 426 to tunnel through the tunnel oxide layer and be trapped in the floating gate 432. These negatively charged electrons then act as an electron barrier between the control gate 434 and the channel 426 that increases the threshold voltage of the memory cell 404. The threshold voltage is a voltage required at the control gate 434 to cause current (e.g., a threshold amount of current) to flow through the channel 426. Fowler-Nordheim tunneling is an example technique for storing a charge in the floating gate, and other techniques, such as channel hot electron injection, may be used.

To read the memory cell 404, a read voltage may be applied to the control gate 434 (e.g., via a corresponding access line 412), and an I/O component 410 (e.g., a sense amplifier) may determine the data state of the memory cell 404 based on whether current passes through the memory cell 404 (e.g., the channel 426) due to the applied voltage. A pass voltage may be applied to all memory cells 404 (other than the memory cell 404 being read) in the same NAND string 406 as the memory cell 404 being read. For example, the pass voltage may be applied on each access line 412 other than the access line 412 of the memory cell 404 being read (e.g., where the read voltage is applied). The pass voltage is higher than the highest read voltage associated with any memory cell data states so that all of the other memory cells 404 in the NAND string 406 conduct, and the I/O component 410 can detect a data state of the memory cell 404 being read by sensing current (or lack thereof) on a corresponding bit line 408. For example, in a single-level memory cell that stores one of two data states, the data state is a "1" if current is detected, and the data state is a "0" if current is not detected. In a multi-level memory cell that stores one of three or more data states, multiple read voltages are applied, over time, to the control gate 434 to distinguish between the three or more data states and determine a data state of the memory cell 404.

To erase the memory cell 404, a strong negative voltage potential may be created between the control gate 434 and the channel 426 (e.g., by applying a large negative voltage to the control gate 434 via a corresponding access line 412). The strong negative voltage at the control gate 434 causes trapped electrons in the floating gate 432 to tunnel back across the oxide layer from the floating gate 432 to the channel 426 and to flow between the common source line 414 and the bit line 408. This removes the electron barrier between the control gate 434 and the channel 426 and decreases the threshold voltage of the memory cell 404 (e.g., to an empty or erased state, which may represent a "1"). In NAND memory, a block is the smallest unit of memory that can be erased. A block of NAND memory includes multiple pages. Thus, an individual page of a block cannot be erased without erasing every other page of the block. In some implementations, a block may be divided into multiple sub-blocks. A sub-block is a portion of a block and may include a subset of pages of the block and/or a subset of memory cells of the block.

As indicated above, FIG. 4 is provided as an example. Other examples may differ from what is described with regard to FIG. 4.

Figure 5:
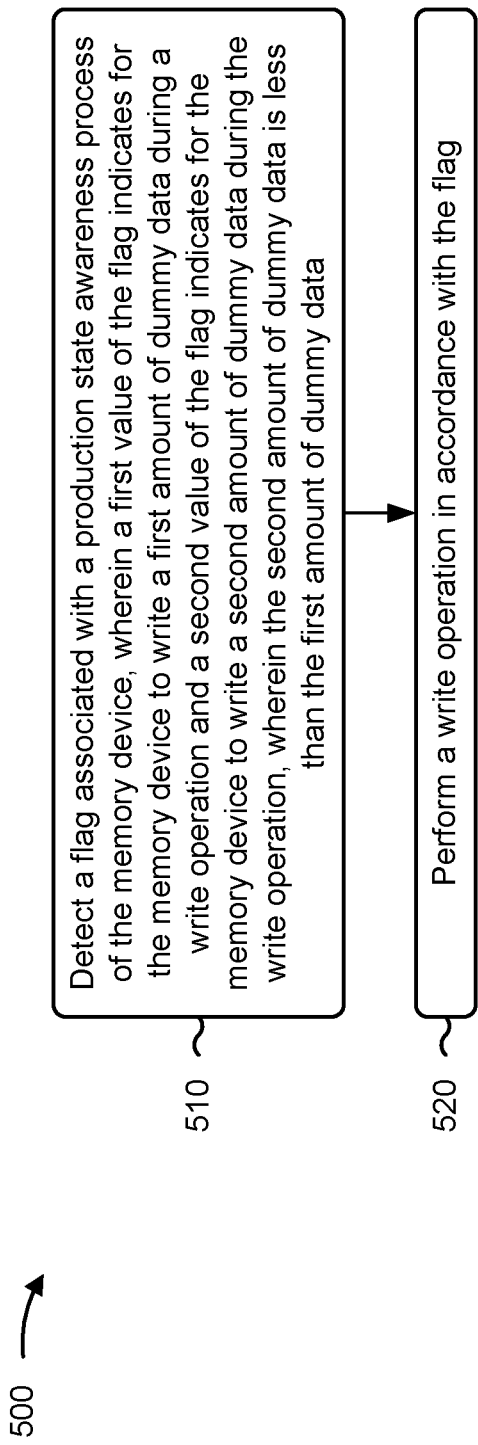
FIG. 5 is a flowchart of an example method associated with production state awareness dummy data management.

FIG. 5 is a flowchart of an example method 500 associated with production state awareness dummy data management. In some implementations, a memory device (e.g., the memory device 120) may perform or may be configured to perform the method 500. In some implementations, another device or a group of devices separate from or including the memory device (e.g., the system 100) may perform or may be configured to perform the method 500. Additionally, or alternatively, one or more components of the memory device (e.g., the local controller 125) may perform or may be configured to perform the method 500. Thus, means for performing the method 500 may include the memory device and/or one or more components of the memory device. Additionally, or alternatively, a non-transitory computer-readable medium may store one or more instructions that, when executed by the memory device (e.g., the local controller 125 of the memory device 120), cause the memory device to perform the method 500.

As shown in FIG. 5, the method 500 may include detecting a flag associated with a production state awareness process of the memory device, where a first value of the flag indicates for the memory device to write a first amount of dummy data during a write operation and a second value of the flag indicates for the memory device to write a second amount of dummy data during the write operation, where the second amount of dummy data is less than the first amount of dummy data (block 510). As further shown in FIG. 5, the method 500 may include performing a write operation in accordance with the flag (block 520).

The method 500 may include additional aspects, such as any single aspect or any combination of aspects described below and/or described in connection with one or more other methods or operations described elsewhere herein.

In a first aspect, performing the write operation in accordance with the flag comprises writing a default quantity of dummy bits to the memory device in accordance with the flag having the first value, wherein the default quantity of dummy bits corresponds to the first amount of dummy data.

In a second aspect, alone or in combination with the first aspect, performing the write operation in accordance with the flag comprises writing a reduced quantity of dummy bits to the memory device in accordance with the flag having the second value, wherein the reduced quantity of dummy bits corresponds to the second amount of dummy data.

In a third aspect, alone or in combination with one or more of the first and second aspects, performing the write operation in accordance with the flag comprises nulling one or more dummy bits in accordance with the flag having the second value.

In a fourth aspect, alone or in combination with one or more of the first through third aspects, performing the write operation in accordance with the flag comprises switching from a multi-plane write operation to a single-plane write operation in accordance with the flag having the second value.

In a fifth aspect, alone or in combination with one or more of the first through fourth aspects, the method 500 includes detecting, in accordance with the flag having the second value, that a production state awareness data size is greater than a threshold percentage of a production state awareness maximum data size, and initiating, in accordance with the production state awareness data size being greater than the threshold percentage of the production state awareness maximum data size, a garbage collection operation.

In a sixth aspect, alone or in combination with one or more of the first through fifth aspects, the method 500 includes adjusting the threshold percentage of the production state awareness maximum data size in accordance with an amount of available memory in the memory device.

In a seventh aspect, alone or in combination with one or more of the first through sixth aspects, detecting the flag comprises detecting a default value of the flag, wherein the default value of the flag is zero.

In an eighth aspect, alone or in combination with one or more of the first through seventh aspects, detecting the flag comprises receiving an indication of the flag from a host device.

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform or may be configured to perform one or more other methods based on operations described herein.

Figure 6:
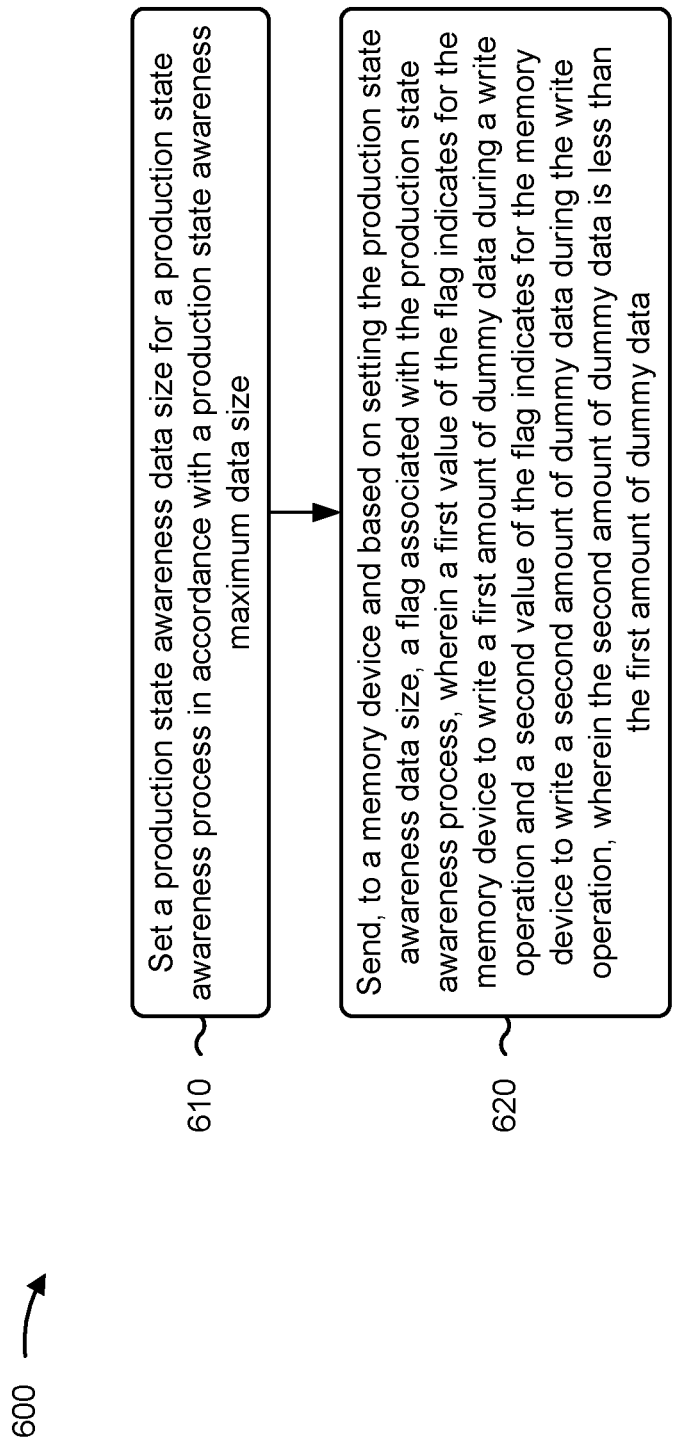
FIG. 6 is a flowchart of an example method associated with production state awareness dummy data management.

FIG. 6 is a flowchart of an example method 600 associated with production state awareness dummy data management. In some implementations, a host device (e.g., the host system 105) may perform or may be configured to perform the method 600. In some implementations, another device or a group of devices separate from or including the host device (e.g., the host processor 150) may perform or may be configured to perform the method 600. Thus, means for performing the method 600 may include the host device and/or one or more components of the host device. Additionally, or alternatively, a non-transitory computer-readable medium may store one or more instructions that, when executed by the host device, cause the host device to perform the method 600.

As shown in FIG. 6, the method 600 may include setting a production state awareness data size for a production state awareness process in accordance with a production state awareness maximum data size (block 610). As further shown in FIG. 6, the method 600 may include sending, to a memory device and based on setting the production state awareness data size, a flag associated with the production state awareness process, where a first value of the flag indicates for the memory device to write a first amount of dummy data during a write operation and a second value of the flag indicates for the memory device to write a second amount of dummy data during the write operation, where the second amount of dummy data is less than the first amount of dummy data (block 620).

The method 600 may include additional aspects, such as any single aspect or any combination of aspects described below and/or described in connection with one or more other methods or operations described elsewhere herein.

In a first aspect, the method 600 includes sending, to the memory device, a write command in accordance with the production state awareness process and the production state awareness data size.

In a second aspect, alone or in combination with the first aspect, setting the production state awareness data size in accordance with the production state awareness maximum data size comprises setting the production state awareness data size in accordance with a percentage of the production state awareness maximum data size.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

In some implementations, a memory device includes one or more components configured to: detect a flag associated with a production state awareness process of the memory device, wherein a first value of the flag indicates for the memory device to write a first amount of dummy data during a write operation and a second value of the flag indicates for the memory device to write a second amount of dummy data during the write operation, wherein the second amount of dummy data is less than the first amount of dummy data; and perform a write operation in accordance with the flag.

In some implementations, a system includes a memory device; and a host device, wherein the host device is configured to: set a production state awareness data size for a production state awareness process in accordance with a production state awareness maximum data size; and send, to the memory device and based on setting the production state awareness data size, a flag associated with the production state awareness process, wherein a first value of the flag indicates for the memory device to write a first amount of dummy data during a write operation and a second value of the flag indicates for the memory device to write a second amount of dummy data during the write operation, wherein the second amount of dummy data is less than the first amount of dummy data.

In some implementations, an apparatus includes means for detecting a flag associated with a production state awareness process of the apparatus, wherein a first value of the flag indicates for the apparatus to write a default amount of dummy data during a write operation and a second value of the flag indicates for the apparatus to write a reduced amount of dummy data during the write operation; and means for performing a write operation in accordance with the flag.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
one or more components configured to:
detect a flag associated with a production state awareness process of the memory device, wherein a first value of the flag indicates for the memory device to write a first amount of dummy data during a production state awareness write operation and a second value of the flag indicates for the memory device to write a second amount of dummy data during the production state awareness write operation, wherein the second amount of dummy data is less than the first amount of dummy data; and
perform the production state awareness write operation in accordance with the flag.

2. The memory device of claim 1, wherein the one or more components, to perform the production state awareness write operation in accordance with the flag, are configured to write a default quantity of dummy bits to the memory device in accordance with the flag having the first value, wherein the default quantity of dummy bits corresponds to the first amount of dummy data.

3. The memory device of claim 1, wherein the one or more components, to perform the production state awareness write operation in accordance with the flag, are configured to write a reduced quantity of dummy bits to the memory device in accordance with the flag having the second value, wherein the reduced quantity of dummy bits corresponds to the second amount of dummy data.

4. The memory device of claim 1, wherein the one or more components, to perform the production state awareness write operation in accordance with the flag, are configured to nullify one or more dummy bits in accordance with the flag having the second value.

5. The memory device of claim 1, wherein the one or more components, to detect the flag, are configured to detect a default value of the flag, wherein the default value of the flag is zero.

6. The memory device of claim 1, wherein the one or more components, to detect the flag, are configured to receive an indication of the flag from a host device.

7. A memory device, comprising:
one or more components configured to:
detect a flag associated with a production state awareness process of the memory device, wherein a first value of the flag indicates for the memory device to write a first amount of dummy data during a write operation and a second value of the flag indicates for the memory device to write a second amount of dummy data during the write operation, wherein the second amount of dummy data is less than the first amount of dummy data; and
perform the write operation in accordance with the flag, wherein the one or more components, to perform the write operation in accordance with the flag, are configured to switch from a multi-plane write operation to a single-plane write operation in accordance with the flag having the second value.

8. A memory device, comprising:
one or more components configured to:
detect a flag associated with a production state awareness process of the memory device, wherein a first value of the flag indicates for the memory device to write a first amount of dummy data during a write operation and a second value of the flag indicates for the memory device to write a second amount of dummy data during the write operation, wherein the second amount of dummy data is less than the first amount of dummy data;
perform a write operation in accordance with the flag;
detect, in accordance with the flag having the second value, that a production state awareness data size is greater than a threshold percentage of a production state awareness maximum data size; and
initiate, in accordance with the production state awareness data size being greater than the threshold percentage of the production state awareness maximum data size, a garbage collection operation.

9. The memory device of claim 8, wherein the one or more components are further configured to adjust the threshold percentage of the production state awareness maximum data size in accordance with an amount of available memory in the memory device.

10. A system, comprising:
a memory device; and
a host device, wherein the host device is configured to:
set a production state awareness data size for a production state awareness process in accordance with a production state awareness maximum data size; and
send, to the memory device and based on setting the production state awareness data size, a flag associated with the production state awareness process, wherein a first value of the flag indicates for the memory device to write a first amount of dummy data during a production state awareness write operation and a second value of the flag indicates for the memory device to write a second amount of dummy data during the production state awareness write operation, wherein the second amount of dummy data is less than the first amount of dummy data.

11. The system of claim 10, wherein the host device is further configured to send, to the memory device, a write command in accordance with the production state awareness process and the production state awareness data size.

12. The system of claim 10, wherein the memory device is configured to write a default quantity of dummy bits to a memory of the memory device in accordance with the flag having the first value, wherein the default quantity of dummy bits corresponds to the first amount of dummy data.

13. The system of claim 10, wherein the memory device is configured to write a reduced quantity of dummy bits to a memory of the memory device in accordance with the flag having the second value, wherein the reduced quantity of dummy bits corresponds to the second amount of dummy data.

14. The system of claim 10, wherein the memory device is configured to nullify one or more dummy bits in accordance with the flag having the second value.

15. A system, comprising:
a memory device; and
a host device, wherein the host device is configured to:
set a production state awareness data size for a production state awareness process in accordance with a production state awareness maximum data size, wherein the host device, to set the production state awareness data size in accordance with the production state awareness maximum data size, is configured to set the production state awareness data size in accordance with a percentage of the production state awareness maximum data size; and
send, to the memory device and based on setting the production state awareness data size, a flag associated with the production state awareness process, wherein a first value of the flag indicates for the memory device to write a first amount of dummy data during a write operation and a second value of the flag indicates for the memory device to write a second amount of dummy data during the write operation, wherein the second amount of dummy data is less than the first amount of dummy data.

16. An apparatus, comprising:

means for detecting a flag associated with a production state awareness process of the apparatus, wherein a first value of the flag indicates for the apparatus to write a default amount of dummy data during a production state awareness write operation and a second value of the flag indicates for the apparatus to write a reduced amount of dummy data during the production state awareness write operation; and means for performing the production state awareness write operation in accordance with the flag.

17. The apparatus of claim 16, further comprising means for switching from a multi-plane write operation to a single-plane write operation in accordance with the flag having the second value.

18. The apparatus of claim 16, further comprising means for detecting, in accordance with the flag having the second value, that a production state awareness data size is greater than a threshold percentage of a production state awareness maximum data size.

19. The apparatus of claim 18, further comprising means for initiating a garbage collection operation in accordance with the production state awareness data size being greater than the threshold percentage of the production state awareness maximum data size.

20. The apparatus of claim 18, further comprising means for adjusting the threshold percentage of the production state awareness maximum data size in accordance with an amount of available memory.

* * * * *